US008892074B2

(12) United States Patent
Zhou

(10) Patent No.: US 8,892,074 B2
(45) Date of Patent: Nov. 18, 2014

(54) MULTIMEDIA MESSAGING SERVICE CENTER AND METHOD FOR CACHING MOBILE PHONE NEWSPAPER THEREOF

(75) Inventor: Shijun Zhou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 416 days.

(21) Appl. No.: 13/257,894

(22) PCT Filed: Oct. 20, 2009

(86) PCT No.: PCT/CN2009/074539
§ 371 (c)(1),
(2), (4) Date: Dec. 14, 2011

(87) PCT Pub. No.: WO2010/145111
PCT Pub. Date: Dec. 23, 2010

(65) Prior Publication Data
US 2012/0083296 A1     Apr. 5, 2012

(30) Foreign Application Priority Data

Jun. 16, 2009   (CN) .......................... 2009 1 0108086

(51) Int. Cl.
*H04M 1/725*    (2006.01)
*H04W 4/12*     (2009.01)
*H04L 12/58*    (2006.01)
*H04L 29/06*    (2006.01)
*H04W 4/18*     (2009.01)
*H04W 28/06*    (2009.01)
*H04L 12/18*    (2006.01)

(52) U.S. Cl.
CPC ................ *H04W 4/12* (2013.01); *H04L 51/22* (2013.01); *H04L 65/103* (2013.01); *H04L 51/38* (2013.01); *H04W 4/18* (2013.01); *H04W 28/06* (2013.01); *H04L 51/30* (2013.01); *H04L 12/1859* (2013.01)

USPC .................... 455/412.1; 455/413; 455/414.1; 455/414.2; 455/466

(58) Field of Classification Search
CPC ..... H04L 67/26; H04L 67/1097; H04L 67/04; H04L 67/06; H04N 21/4586; H04N 21/47214
See application file for complete search history.

(56) References Cited

U.S. PATENT DOCUMENTS 6,674,713 B1 *   1/2004   Berg et al. ..................... 370/217
7,529,817 B2     5/2009   Kim
(Continued)

FOREIGN PATENT DOCUMENTS

CN          1467964 A        1/2004
CN          1750669 A        3/2006
(Continued)

OTHER PUBLICATIONS

International Search Report in international application No. PCT/CN2009/074539, mailed on Mar. 4, 2010.
(Continued)

*Primary Examiner* — Dai A Phuong
(74) *Attorney, Agent, or Firm* — Oppedahl Patent Law Firm LLC

(57) ABSTRACT

A multimedia messaging service center (MMSC) and method for caching mobile phone newspaper thereof are disclosed. The MMSC comprises a memory module, a mobile phone newspaper message processing module and a network attached shortage (NAS) module. In this method, after receiving a multimedia message, the MMSC decodes the multimedia message and determines whether the multimedia message is a mobile phone newspaper message; if it is, then the MMSC transmits the message body of the multimedia message to the mobile phone newspaper message processing module. The mobile phone newspaper message processing module determines whether the same message body has been saved in the memory module; if it is, then said message body is discarded, otherwise, said message body is saved into the memory module. The processing efficiency of the MMSC and the user experience are improved by the present invention.

8 Claims, 3 Drawing Sheets

(56) References Cited

U.S. PATENT DOCUMENTS

| | | |
|---|---|---|
| 2004/0229636 A1 | 11/2004 | Kim |
| 2005/0271049 A1 | 12/2005 | Jain et al. |
| 2008/0104645 A1* | 5/2008 | Kishimoto ............... 725/97 |
| 2008/0176562 A1 | 7/2008 | Howard |
| 2008/0183719 A1* | 7/2008 | Kageyama et al. ......... 707/10 |
| 2008/0293442 A1 | 11/2008 | Kim |
| 2010/0070565 A1* | 3/2010 | Leblanc et al. ............. 709/203 |
| 2011/0106910 A1* | 5/2011 | Grasset ..................... 709/217 |
| 2012/0185573 A1* | 7/2012 | Ramanathan et al. ...... 709/219 |

FOREIGN PATENT DOCUMENTS

| | | |
|---|---|---|
| CN | 1997172 A | 7/2007 |
| CN | 101198086 A | 6/2008 |
| CN | 101389094 A | 3/2009 |
| CN | 101447932 A | 6/2009 |
| EP | 1478163 A2 | 11/2004 |
| EP | 1755353 A1 | 2/2007 |
| EP | 1835674 A2 | 9/2007 |
| JP | 2006251928 A | 9/2006 |
| RU | 2005133391 A | 5/2007 |
| WO | 2009045946 A2 | 4/2009 |

OTHER PUBLICATIONS

English Translation of the Written Opinion of the International Search Authority in international application No. PCT/CN2009/074539, mailed on Mar. 4, 2010.

Supplementary European Search Report in international application No. PCT/CN2009/074539, mailed on Jun. 16, 2014.

* cited by examiner

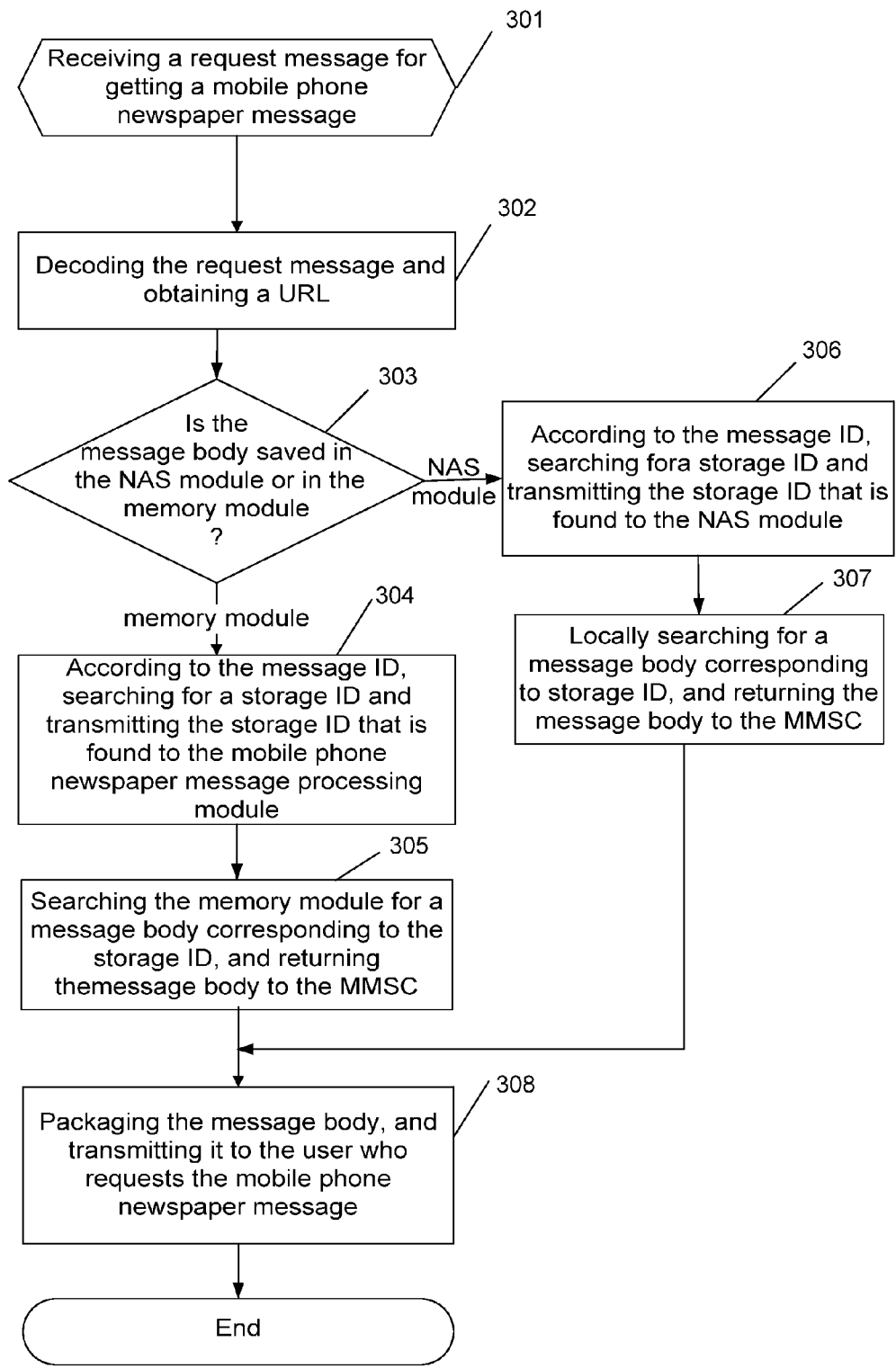

MULTIMEDIA MESSAGING SERVICE CENTER AND METHOD FOR CACHING MOBILE PHONE NEWSPAPER THEREOF

TECHNICAL FIELD

The present invention relates to Multimedia Messaging Service (MMS) in the filed of communications, and in particular to a multimedia messaging service center and a method for caching a mobile phone newspaper message thereof.

BACKGROUND

MMS refers to a messaging service that can transmit multimedia contents among mobile phones as well as between mobile phones and other applications such as an Email server. The MMS is classified according to operators to which users belong and regions where users are located. A Multimedia Messaging Service Center (MMSC) to which users belong is responsible for providing the users with Multimedia Messaging Services.

A Multimedia Messaging Service Gateway (MMSG) uses an MM7 interface to realize interconnection with an MMSC and SP (Service Providers) and to distribute Single Sign-On SP services throughout the whole network, so as to reduce the transmit flow of an MM4 interface and improve the overall processing capacity of a present MMSC network.

"Mobile Phone Newspaper" is a self-owned service developed by China Mobile (CMCC) in cooperation with domestic mainstream media institutions, for the purpose of providing users with timely messaging services (including contents such as news, sports, entertainments, culture and life) through the MMS and WAP (Wireless Application Protocol). By making great efforts on this service and based on abundant consumer resources, the CMCC has achieved great traffic in this service, which has accounted for about 70% of the whole MMS traffic.

Everyday, two messages of the Mobile Phone Newspaper are transmitted to each user at regular time. For the users in a same province, a group-sending strategy is adopted. In general, a message of the Mobile Phone Newspaper transmitted to an MMSG comprises 10000 destination addresses, and the content of the MMS transmitted to all the users in a same province is identical. However, the capacity of an MMSC for processing group-sending is finite. Therefore, the MMSG classifies the numbers belonging to one MMSC into a message, and split the message according to the capacity of a corresponding MMSC for processing the number of destination addresses. Generally, an MMSC has the capacity for processing 30 destination addresses. Therefore, before forwarding a message to the MMSC, the MMSG firstly split the message to be forwarded into a message comprising 30 destination addresses. That is to say, a message including 10,000 addresses which is submitted by a Mobile Phone Newspaper server may become at least 300 messages with the same message body after being transmitted to the MMSC. After receiving a message, the MMSC will decode and save this message and then notify the corresponding mobile phone users, no matter whether the message body is the same. Although the MMSC will timely notify the users upon receipt of a mobile phone newspaper message, the time for the users to get the mobile phone newspaper message from the MMSC is not regular. There is likelihood that the users may get the message upon receiving a notification message or do not get the message after a long time passes. The MMSC is incapable of saving a great deal of message bodies in its memory due to its finite memory space. Therefore, in a general message processing, Network Attached Storage (NAS) is adopted to store message bodies, that is to say, the MMSC saves each submitted message into the NAS. For general services, such solution is feasible. However, for the services such as a mobile phone newspaper which is characterized by the same MMS content and great traffic, it is needed for the NAS to call IO frequently, thus affecting the processing efficiency of the MMSC and reducing its processing capacity.

SUMMARY

The technical problem to be solved by the present invention is to provide a multimedia messaging service center (MMSC) and a method for caching a mobile phone newspaper message thereof, so as to improve the processing efficiency of the MMSC and user experience.

The present invention discloses an MMSC which comprises a memory module and a mobile phone newspaper message processing module, wherein:

the memory module is adapted to save a message body of a mobile phone newspaper message received by the MMSC; and the mobile phone newspaper message processing module is adapted to determine whether a same message body has been saved in the memory module according to size and header information of the message body of the mobile phone newspaper message received by the MMSC; if the same message body has been saved, then the message body is discarded; otherwise, the message body is saved into the memory module.

The mobile phone newspaper message processing module may be further adapted to determine whether there is available space in the memory module before saving a message body; and to apply for a memory space for the message and save the message when there is space available; and to return a storage failure message to the MMSC if there is no space available.

The MMSC may further comprise an NAS module, which is adapted to save a message body of a mobile phone newspaper message that is failed to be saved in the memory module and to return its own content index to the MMSC.

The mobile phone newspaper message processing module may be further adapted to return a content index of the memory module to the MMSC when the memory module has saved a message body as same as a received message body and has successfully saved the received message body; and further to, after receiving a storage identification (ID), search the memory module for a corresponding message body according to the ID, and return the message body that is found to the MMSC; and the NAS module is further adapted to, after receiving a storage ID, search for a corresponding message body locally according to the ID and return the message body that is found to the MMSC.

The present invention also discloses a method for caching a mobile phone newspaper message by an MMSC, comprising: after receiving a multimedia message by the MMSC, decoding the multimedia message and determining whether the multimedia message is a mobile phone newspaper message, if it is, transmitting a message body of the message to a mobile phone newspaper message processing module; and determining by the mobile phone newspaper message processing module whether a same message body has been saved in a memory module, if it has, then discarding the message body, otherwise, saving the message body into the memory module.

The mobile phone newspaper message processing module may further determine whether a same message body has been saved in the memory module according to size and header information of a received message body.

Before saving the received message body, the mobile phone newspaper message processing module may further perform the following operations:

determining whether there is available space in the memory module; if there is, then applying for a memory space for the message body and saving the message body, and returning a content index of the memory module to the MMSC; otherwise, returning a storage failure message to the MMSC.

The MMSC may transmit a message body of a corresponding message to the NAS module after receiving the storage failure message; the NAS module may save the received message body and return its own content index to the MMSC; and the MMSC may save the received content index and transmit a notification message to a destination number obtained through decoding.

A specific flag bit of a URL (Uniform/Universal Resource Locator) included in the notification message is adapted to identify whether a message body of a mobile phone newspaper message corresponding to the destination number is saved in the memory module or in the NAS module.

After receiving a request message for getting a mobile phone newspaper message, the MMSC may parse the request message, and according to a flag bit of the URL obtained through parsing, determine whether the message body of mobile phone newspaper message the user requests is saved in the NAS module or in the memory module; if the message body is saved in the NAS module, then the MMSC searches a saved content index of the NAS module for a storage ID of the message body in the NAS module according to a message ID obtained through parsing, and transmits the storage ID to the NAS module; the NAS module searches for a corresponding message body locally according to the received storage ID, and returns the corresponding message body found out to the control module; the control module packages the received message body and transmits it to the user who requests the mobile phone newspaper message;

if the message body is saved in the memory module, then the MMSC searches a saved content index of the memory module for a storage ID of the message body in the memory module according to a message ID obtained through parsing, and transmits the storage ID to the mobile phone newspaper message processing module; the mobile phone newspaper message processing module searches the memory module for a corresponding message body according to the received storage ID, and returns the corresponding message body found out to the control module; and the control module packages the received message body and transmits it to the user who requests the mobile phone newspaper message.

In view of that mobile phone newspaper messages received each time substantially have the same content, the present invention saves the mobile phone newspaper messages in the memory of the MMSC. When a user wants to get a mobile phone newspaper message, the MMSC directly reads it out from the memory, therefore reducing the times of saving into and reading from the NAS module, further, solving the IO bottleneck problem of the NAS module and greatly improving the user satisfaction.

BRIEF DESCRIPTION OF THE DRAWINGS

The drawings described here are provided for better understanding of the present invention and constitute a part of the present invention. The illustrative embodiments and their descriptions are used to interpret the present invention but do not constitute an inappropriate limitation to the present invention. In these drawings:

FIG. 3 is a flow chart illustrating the processing when the MMSC receives a request message from a user for getting a mobile phone newspaper message in the method according to an embodiment of the present invention.

DETAILED DESCRIPTION OF THE INVENTION

The present invention will be described in detail below with reference to the attached drawings and in combination with the embodiments. It should be noted that, if there is no conflict, the embodiments of the present invention and the characteristics in the embodiments can be combined with one another.

Figure 1:
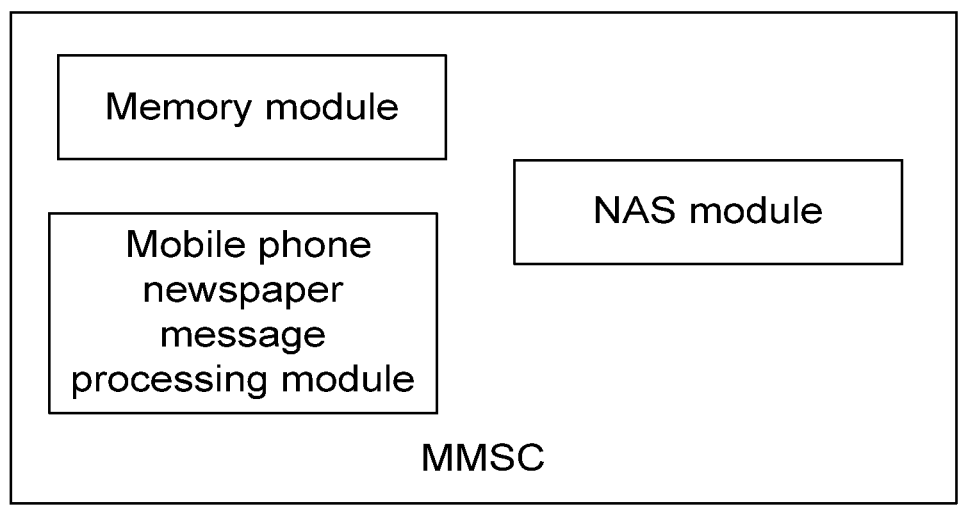
FIG. 1 is a structural diagram of an MMSC according to an embodiment of the present invention.

FIG. 1 is a structural diagram of an MMSC according to an embodiment of the present invention. As shown in FIG. 1, the MMSC according to the embodiment of the present invention mainly comprises a memory module, a mobile phone newspaper message processing module and an NAS module, wherein:

the memory module is adapted to save the message body of a mobile phone newspaper message received by the MMSC;

the mobile phone newspaper message processing module is adapted to determine whether a same message body has been saved in the memory module according to the size and header information of the message body of the mobile phone newspaper message received by the MMSC; if the same message body has been saved, then the mobile phone newspaper message processing module discards said message body, and returns the content index of the memory module to the MMSC; otherwise, it determines whether there is available space in the memory module, and applies for a memory space for the message and saves the message if there exists available space, and then returns the content index of the memory module to the MMSC; if there is no space available, it returns a storage failure message to the MMSC; and the mobile phone newspaper message processing module is further adapted to, after receiving a storage identification (ID), search the memory module for a corresponding message body according to the ID, and return the message body that is found to the MMSC; and the NAS module is adapted to save the message body of a mobile phone newspaper message which is failed to be saved in the memory module, and to return its own content index to the MMSC; and further to, after receiving a storage ID, search for a corresponding message body locally according to the ID and return the message body that is found to the MMSC.

Figure 2:
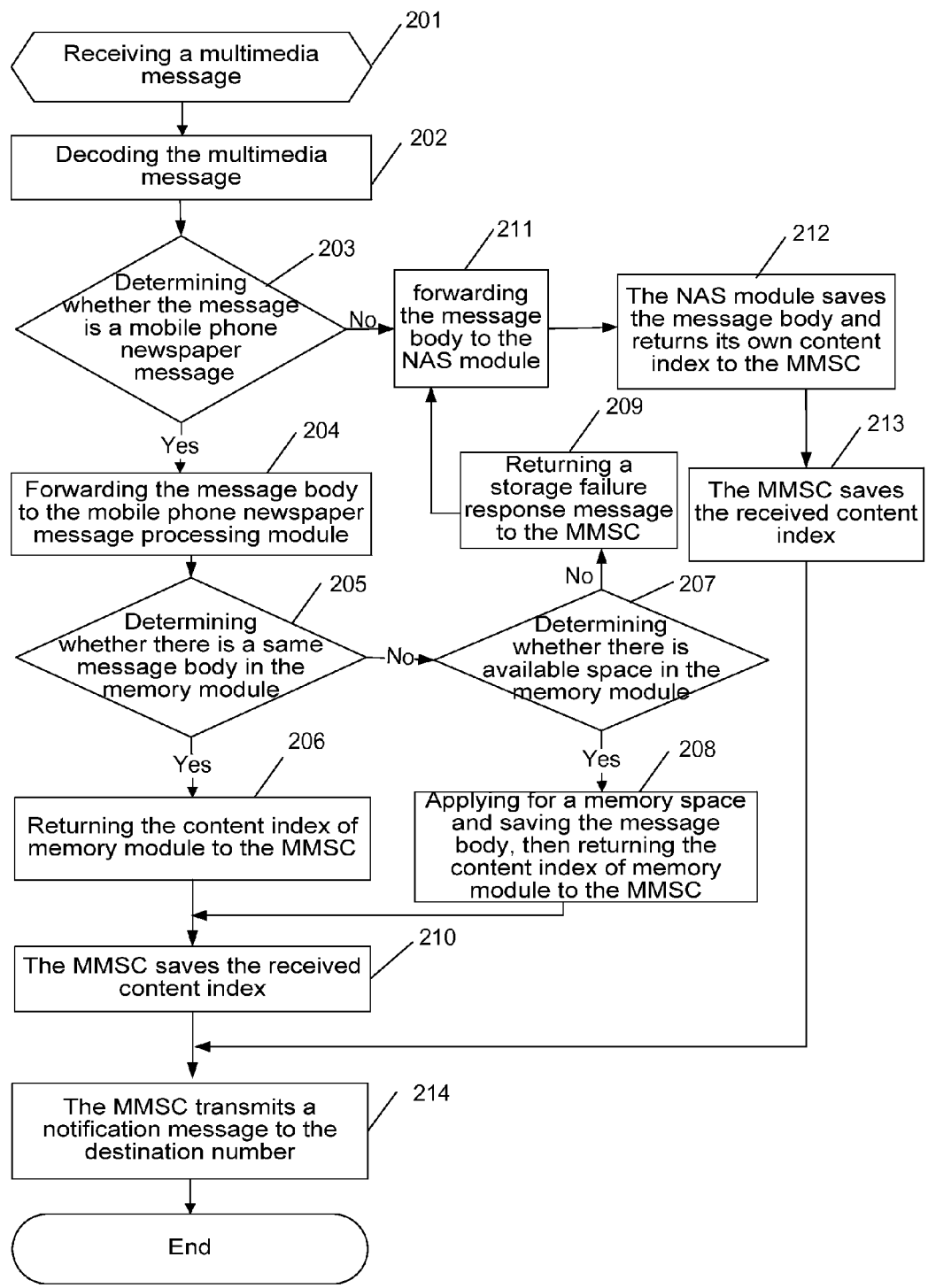
FIG. 2 is a flow chart illustrating the processing when the MMSC receives a mobile phone newspaper message in a method according to an embodiment of the present invention.

FIG. 2 is a flow chart illustrating the processing when the MMSC receives a mobile phone newspaper message in a method according to an embodiment of the present invention. As shown in FIG. 2, in the method according to the embodiment of the present invention, the processing flow when the MMSC receives a mobile phone newspaper message, mainly comprises:

step 201: the MMSC receives a multimedia message;

step 202: the message is decoded to obtain a message body and a destination number;

step 203: it is determined whether the message is a mobile phone newspaper message, if it is, step 204 is executed; otherwise, step 211 is executed;

step 204: the message body obtained through decoding is forwarded to the mobile phone newspaper message processing module;

step 205: the mobile phone newspaper message processing module determines whether there has been a same message saved in the memory module according to the size and header information of the received message body; if there has, step 206 is executed; otherwise, step 207 is executed;

step 206: the mobile phone newspaper message processing module returns the content index of the memory module to the MMSC, and then step 210 is executed;

step 207: the mobile phone newspaper message processing module determines whether there is available space in the memory module; if there is, step 208 is executed; otherwise, step 209 is executed;

step 208: the mobile phone newspaper message processing module applies for a memory space for the message body and saves the message body, then returns the content index of the memory module to the MMSC; and then step 210 is executed;

step 209: the mobile phone newspaper message processing module returns a storage failure response message to the MMSC, and then step 211 is executed;

step 210: the MMSC saves the received content index, and then step 214 is executed;

Step 211: the MMSC transmits the message body obtained through decoding to the NAS module;

step 212: the NAS module saves the received message body and returns its own content index to the MMSC;

step 213: the MMSC saves the received content index; and step 214: the MMSC transmits a notification message to the destination number obtained through decoding, and the current mobile phone newspaper message processing ends.

The specific flag bit of a URL (Uniform/Universal Resource Locator) included in the notification message is used to identify whether the message body of the mobile phone newspaper message corresponding to the destination number is saved in the memory module or in the NAS module.

FIG. 3 is a flow chart illustrating the processing when the MMSC receives a request message from a user for getting a mobile phone newspaper message in the method according to an embodiment of the present invention. As shown in FIG. 3, in the method according to the embodiment of the present invention, the processing flow when the MMSC receives a request message from a user for getting a mobile phone newspaper message, mainly comprises:

step 301: the MMSC receives a request message for getting a mobile phone newspaper;

step 302: the request message is decoded to obtain a URL; the URL included in the request message is a URL distributed by the MMSC;

step 303: according to the flag bit of the URL, it is determined whether the message body of the mobile phone newspaper message that the user requests is saved in the NAS module or in the memory module; if the message body is saved in the memory module, then step 304 is executed; if the message body is saved in the NAS module, then the step 306 is executed;

step 304: according to the message ID of the URL, the MMSC searches the saved content index of the memory module for the storage ID of the message body in the memory module, and transmits the storage ID that is found to the mobile phone newspaper message processing module;

step 305: according to the received storage ID, the mobile phone newspaper message processing module searches the memory module for a corresponding message body, and returns the message body that is found to the MMSC, and then step 308 is executed;

step 306: according to the message ID of the URL, the MMSC searches the saved content index of the NAS module for the storage ID of the message body in the NAS module, and transmits the storage ID that is found to the NAS module;

step 307: the NAS module searches for a corresponding message body locally according to the received storage ID, and returns the message body that is found to the MMSC; and step 308: the MMSC packages the received message body, and transmits the packaged message body to the user who requests the mobile phone newspaper.

In view of that mobile phone newspaper messages received each time substantially have the same content, the present invention saves the mobile phone newspaper messages in the memory of the MMSC. When a user wants to get a mobile phone newspaper message, the MMSC directly reads it out from the memory, thus reducing the times of saving into and reading from an NAS module, furthermore, solving the IO bottleneck problem of the NAS module and greatly improving the user satisfaction. The above is just a relatively basic implementation of the present invention, and the protection scope of the present invention is not limited to this implementation. Any local modification or substitute made by those skilled in the art within the technical scope disclosed by the present invention shall be covered by the protection scope of the present invention.

The invention claimed is:

1. A Multimedia Messaging Service Center (MMSC) comprising a memory module and a mobile phone newspaper message processing module, wherein the memory module is adapted to save a message body of a mobile phone newspaper message received by the MMSC; and the mobile phone newspaper message processing module is adapted to determine whether a same message body has been saved in the memory module according to size and header information of the message body of the mobile phone newspaper message received by the MMSC; if the same message body has been saved, then the message body is discarded; otherwise, the message body is saved into the memory module;

wherein the MMSC further comprising a network attached storage (NAS) module, wherein the NAS module is adapted to save the message body of the mobile phone newspaper message that is failed to be saved in the memory module and to send a content index of the NAS module to the MMSC;

wherein the mobile phone newspaper message processing module is further adapted to send a content index of the memory module to the MMSC when the memory module has saved the message body as same as a received message body and has successfully saved the received message body; and further to, after receiving a storage identification (ID) from the message body, the mobile phone newspaper message processing module searches the memory module for a corresponding message body according to the storage ID, and send the message body that is found to the MMSC; and the NAS module is further adapted to, after receiving the storage ID, search for a corresponding message body locally according to the storage ID and send the message body that is found to the MMSC.

2. The MMSC according to claim 1, wherein the mobile phone newspaper message processing module is further adapted to determine whether there is available space in the memory module before saving a message body; and to apply for a memory space for the message and save the message when there is space available; and to send a storage failure message to the MMSC if there is no space available.

3. A method for caching a mobile phone newspaper message by a Multimedia Messaging Service Center (MMSC), comprising:

after receiving a multimedia message by the MMSC, decoding the multimedia message and determining whether the multimedia message is a mobile phone newspaper message, if it is, transmitting a message body of the message to a mobile phone newspaper message processing module; and determining by the mobile phone newspaper message processing module whether a same message body has been saved in a memory module, if it has, then discarding the message body, otherwise, saving the message body into the memory module;

wherein the mobile phone newspaper message processing module determines whether the same message body has been saved in the memory module according to size and header information of a received message body;

wherein a network attached storage (NAS) module saves the message body of a mobile phone newspaper message that is failed to be saved in the memory module and sends a content index of the NAS module to the MMSC;

wherein the mobile phone newspaper message processing module sends a content index of the memory module to the MMSC when the memory module has saved a message body as same as a received message body and has successfully saved the received message body; and after receiving a storage identification (ID) from the message body, the mobile phone newspaper message processing module searches the memory module for a corresponding message body according to the storage ID, and sends the message body that is found to the MMSC; and after receiving the storage ID, the NAS module searches for a corresponding message body locally according to the storage ID and sends the message body that is found to the MMSC.

4. The method for caching a mobile phone newspaper message by an MMSC according to claim 3, wherein the mobile phone newspaper message processing module further performs the following operations before saving a received message body:

determining whether there is available space in the memory module; if there is, then applying for a memory space for the message body and saving the message body, and then returning a content index of the memory module to the MMSC; otherwise, returning a storage failure message to the MMSC.

5. The method for caching a mobile phone newspaper message by an MMSC according to claim 4, wherein the MMSC transmits a message body of a corresponding message to an NAS module after receiving the storage failure message; the NAS module saves the received message body and sends the content index of the NAS module to the MMSC; and the MMSC saves the received content index and transmits a notification message to a destination number obtained through decoding.

6. The method for caching a mobile phone newspaper message by an MMSC according to claim 5, wherein a specific flag bit of a URL is included in the notification message.

7. The method for caching a mobile phone newspaper message by an MMSC according to claim 4, wherein a specific flag bit of a URL is included in the notification message.

8. The method for caching a mobile phone newspaper message by an MMSC according to claim 3, wherein the MMSC when receiving a request message for getting a mobile phone newspaper message, parses the request message, and according to a flag bit of a URL obtained through parsing, determines whether a message body of the mobile phone newspaper message the user requests is saved in an NAS module or in the memory module; if the message body is saved in the NAS module, then the MMSC searches a saved content index of the NAS module for a storage ID of the message body in the NAS module according to a message ID obtained through parsing, and transmits the storage ID to the NAS module; the NAS module searches for a corresponding message body locally according to the received storage ID, and sends the corresponding message body found out to a control module; and the control module packages the received message body and transmits it to the user who requests the mobile phone newspaper message;

if the message body is saved in the memory module, then the MMSC searches a saved content index of the memory module for a storage ID of the message body in the memory module according to a message ID obtained through parsing, and transmits the storage ID to the mobile phone newspaper message processing module; the mobile phone newspaper message processing module searches the memory module for a corresponding message body according to the received storage ID, and sends the corresponding message body found out to the control module; and the control module packages the received message body and transmits it to the user who requests the mobile phone newspaper message.

* * * * *